United States Patent [19]
Dereszynski

[11] 3,881,391
[45] May 6, 1975

[54] QUICK-MOUNT CAPS
[76] Inventor: Timothy B. Dereszynski, 700 W. Layton Ave., Milwaukee, Wis. 53221
[22] Filed: July 5, 1973
[21] Appl. No.: 376,310

[52] U.S. Cl. ............................ 85/55; 85/35; 85/56
[51] Int. Cl. .............................................. A47g 3/00
[58] Field of Search ..................... 85/35, 53, 55, 56

[56] References Cited
UNITED STATES PATENTS

| | | | |
|---|---|---|---|
| 798,865 | 9/1905 | Bailey | 85/35 |
| 2,234,097 | 3/1941 | Tinnerman | 85/35 |
| 3,241,427 | 3/1966 | Bosler | 85/56 |
| 3,485,134 | 12/1969 | Ott | 85/55 |

FOREIGN PATENTS OR APPLICATIONS

| | | | |
|---|---|---|---|
| 1,296,753 | 5/1962 | France | 85/55 |

*Primary Examiner*—Edward C. Allen
*Attorney, Agent, or Firm*—Ronald E. Barry

[57] ABSTRACT

A hold-down bolt cover assembly including a cylindrical body member closed on one end and having a pair of annular grooves around the inside surface of the body, the grooves being located a predeterminated distances from the open end of the body member and a resilient disc having an outer diameter greater than the inside diameter of the body member, a central hub and an opening having a diameter smaller than the diameter of the hold-down bolt, the disc being mounted in one of said grooves depending on the length of the hold-down bolt, the assembly being mounted on the bolt by inserting the exposed end of the bolt through the opening in the disc.

9 Claims, 4 Drawing Figures

PATENTED MAY 6 1975  3,881,391

QUICK-MOUNT CAPS

BACKGROUND OF THE INVENTION

Bathroom fixtures are commonly mounted on the floor by means of hold-down bolt assemblies which extend upward from the floor through the fixture. Various types of caps or covers have been used to protect the bolt assembly from corrosion and to also hide the bolt to present a more aesthetic appearance. In the event the threaded end of the bolt projects above the fixture a distance greater than the length of the cap, the bolt must be cut off in order for the cap to seat against the fixture. The additional time and labor required to cut off the bolt adds to the cost of the job.

SUMMARY OF THE INVENTION

The hold-down cap or cover assembly of the present invention is readily adapted to the conventional length bolt and eliminates the necessity of cutting off the extended end of the bolt. The cap includes a cylindrical body member and a disc which can be readily snapped into one of two grooves within the body member. The disc includes a centrally located opening which is used to mount the disc on the end of the threaded bolt. The cap is provided with an extended skirt to accommodate the length of the bolt. The two grooves make the assembly adaptable to be mounted on the bolt assembly even if the threaded bolt does not extend above the nut.

DRAWINGS

DESCRIPTION OF THE INVENTION

Figure 1:
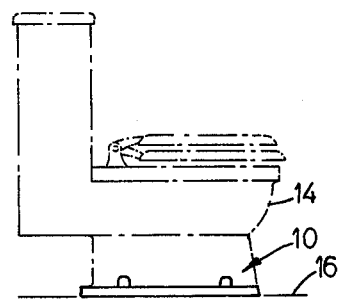
FIG. 1 is a side view in elevation showing a portion of a bathroom fixture with the cover assembly shown in position of the hold-down bolt.
Figure 3:
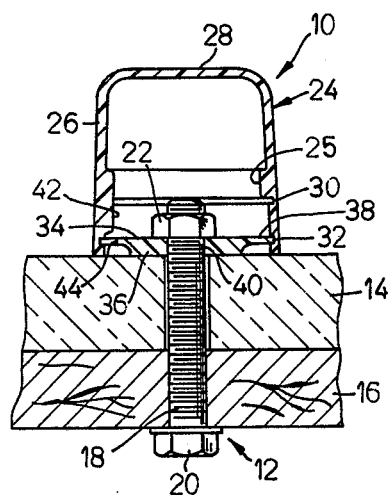
FIG. 3 is a side view in elevation of the assembly of this invention showing the disc located in the second groove for mounting the cap on a hold-down bolt.
Figure 2:
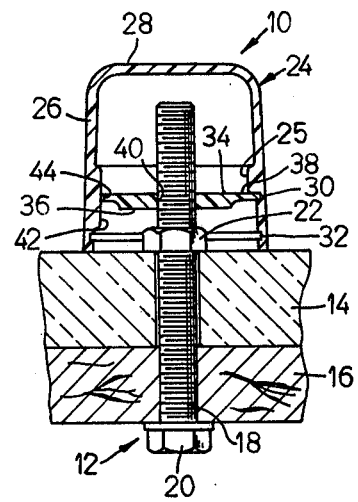
FIG. 2 is a sectional side view in elevation showing the assembly of this invention with disc located in the first groove in the cap.
Figure 4:
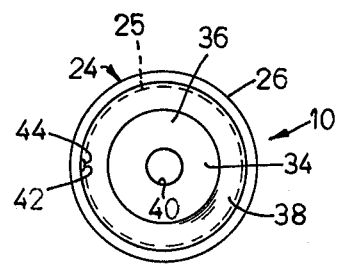
FIG. 4 is an end view of the open end of the cap showing the disc seated in the first groove in the cap.

The hold-down bolt cap or cover assembly 10 of the present invention is used to cover the exposed end of the hold-down bolt assembly 12 commonly used to secure a bathroom fixture 14 to the floor 16. In this regard, the bolt assembly 12 includes a bolt 18 having a head 20 which is located below the floor with the threaded end of the bolt extending upward through the fixture. A nut 22 is secured to the threaded end of the bolt and turned down to hold the fixture in position. The exposed end of the bolt and the nut are covered by means of the bolt cover assembly 10.

The hold-down bolt cover assembly 10 includes a cap or body member 24 having a cylindrical side wall or skirt 26 closed at one end by means of a top 28. The body member is provided with a first annular groove 30 which is located a distance from the open end of the cap equal to or greater than the height or thickness of the nut 22. A second annular groove 32 is located in close proximity to the open end of the side wall or skirt as more particularly described hereinafter.

The body member 24 is retained on the threaded end of the bolt 18 by means of a disc 34. The disc 34 includes a central hub 36 and a radially extending flange 38, the flange 38 having an outer diameter greater than the inner diameter of the cylindrical side wall 26 and less than the outer diameter of the grooves 30 and 32.

The disc 34 is prevented from being dislodged inwardly into the member 24 by means of a flange or stop 25. In this regard the flange 25 has an inside diameter less than the inside diameter of the member 24. The disc 34 will seat on the flange 25 preventing the disc from being pushed into the member 24.

Means are provided for mounting the disc 34 on the threaded end of the bolt 18 in the form of a central opening 40 in the hub 36. The opening 40 has a diameter slightly less than the diameter of the threaded end of the bolt 18.

The cap or body member 24 is prepared for mounting on the bolt by inserting the disc 34 into the cap until it seats in one of the grooves 30 or 32. If the bolt 18 extends above the nut 22 the disc 34 is seated in the groove 30. The assembly is then placed over the bolt 18 with the bolt aligned with the opening 40 and pushed down until the cap bears against the surface of the fixture. Since the opening 40 is smaller than the outside diameter of the threaded end of the bolt, it will seat tightly in the threads of the bolt to hold the assembly in position.

Means are provided for removing the assembly 10 from the bolt 18 without damaging the disc 34. Such means is in the form of a rib 42 provided on the inside surface of the disc and a groove 44 provided on the periphery of the disc 34. The assembly is removed by rotating the cap 24 to unscrew the disc from the threaded end of the bolt 18.

In the event there is insufficient room on the end of the threaded bolt to mount the cap, the disc 34 is placed on the threaded end of the bolt before the nut is turned down against the fixture. The central portion or hub 36 at the center of the disc will space the flange 38 upward from the fixture a distance equal to the thickness of the hub projecting from the disc. The disc 34 will then be spaced upwardly from the fixture a distance sufficient for the disc to seat in the second groove 32 of the cap.

I claim:

1. A bolt cover assembly for covering the exposed end of a hold-down bolt and nut for a toilet fixture, the assembly comprising:
   a cap having a hollow cylindrical body member,
   a top enclosing one end of said body member,
   a first groove in said body member spaced upwardly from the open end a distance greater than the height of the nut,
   and a second groove in said body member between said first groove and the open end of said member,
   and a resilient disc having a central hub, a flange extending radially outward from said hub a distance greater than the inner diameter of said cylindrical body member and a central opening in said disc having a diameter less than said bolt, said second groove being spaced inwardly from the open end of said member a distance substantially equal to the thickness of the central hub, whereby said disc is adapted to be mounted on said bolt on either side of the nut and said cap can be mounted on said disc with said flange seated in one of said first or second grooves.

2. The assembly according to claim 1 including a flange on the inside surface of said member, said flange forming a continuation of the upper surface of said first groove and having an inner diameter smaller than the inner diameter of said member to form a seat for said disc.

3. The hold-down bolt cover assembly according to claim 1 including a rib on the inside surface of said cylindrical body member and a groove in the outer periphery of said disc whereby said disc is restricted from rotation relative to said body member when mounted on said groove.

4. The cover assembly according to claim 1 wherein said cylindrical body member is formed as a unitary member from plastic material.

5. In combination with a hold-down nut and bolt assembly for a toilet fixture, the assembly including a bolt having a threaded end extending beyond the nut, a cover assembly for the nut and threaded end of the bolt comprising a cap having a cylindrical side wall, a closed end and an open end, a first groove on the inside surface of said side wall spaced from the open end of said cap a distance greater than the height of the nut and second groove on the inside surface of said side wall spaced inwardly from the open end of said cap a distance less than said first groove, and a disc having a central hub, a flange extending outwardly from the outer portion of said hub a distance greater than the inner diameter of said cylindrical side wall and a central opening in said hub smaller than the outer diameter of the threaded end of said bolt whereby said disc can be mounted on said bolt and said cap can be mounted on said disc with the disc seated in one of said first and second grooves.

6. The assembly according to claim 5 including a flange on the inside surface of said cap, said flange being located inwardly of the upper surface of said first groove and having an inner diameter smaller than the inner diameter of said cap whereby said disc will seat on said flange when seated in said first groove.

7. The combination according to claim 5 including a rib on the inside surface of said cylindrical cap and a groove in said disc for mating engagement with said rib whereby said disc cannot rotate independent of said cap.

8. The combination according to claim 7 wherein said cap is formed as a unitary member from plastic material.

9. The combination according to claim 7 wherein said second groove in said cap is located a distance from the open end of said cap equal to the thickness of said hub.

* * * * *